United States Patent
Fitch et al.

(10) Patent No.: US 12,093,049 B2
(45) Date of Patent: Sep. 17, 2024

(54) COVERAGE PATH PLANNING

(71) Applicant: SWARMFARM ROBOTICS PTY LTD., Gindie (AU)

(72) Inventors: Robert Charles Fitch, Darlington (AU); Grant Parker Louat, Gindie (AU); Andrew James Bate, Gindie (AU); Jocelyn Ann Bate, Gindie (AU); William John Philip McCarthy, Emerald (AU)

(73) Assignee: SWARMFARM ROBOTICS PTY LTD, Gindie (AU)

( * ) Notice: Subject to any disclaimer, the term of this patent is extended or adjusted under 35 U.S.C. 154(b) by 418 days.

(21) Appl. No.: 17/311,103

(22) PCT Filed: Dec. 4, 2018

(86) PCT No.: PCT/AU2018/051296
§ 371 (c)(1),
(2) Date: Jun. 4, 2021

(87) PCT Pub. No.: WO2019/136510
PCT Pub. Date: Jul. 18, 2019

(65) Prior Publication Data
US 2021/0333795 A1    Oct. 28, 2021

(51) Int. Cl.
*G05D 1/00* (2024.01)
*A01B 79/00* (2006.01)

(52) U.S. Cl.
CPC ......... *G05D 1/0219* (2013.01); *A01B 79/005* (2013.01); *G05D 1/0217* (2013.01); *G05D 1/0088* (2013.01)

(58) Field of Classification Search
CPC .................................................. G05D 1/0219
See application file for complete search history.

(56) References Cited

U.S. PATENT DOCUMENTS

| 10,560,666 B2 * | 2/2020 | Chandra ............... G05D 1/0202 |
| 2004/0193349 A1 | 9/2004 | Flann et al. |
| 2005/0273253 A1 * | 12/2005 | Diekhans ............... G01C 21/20 701/50 |

(Continued)

FOREIGN PATENT DOCUMENTS

WO    2017077113 A1    5/2017

OTHER PUBLICATIONS

International Search Report dated Jan. 14, 2019 for corresponding International Application No. PCT/AU2018/051296, filed Dec. 4, 2018.

(Continued)

*Primary Examiner* — Seth A Silverman
(74) *Attorney, Agent, or Firm* — David D. Brush; Westman, Champlin & Koehler, P.A.

(57) ABSTRACT

A method of planning a coverage path to cover an area. The method includes a computing arrangement iteratively receiving, generating and displaying. The computing arrangement is configured to receive a range acceptable user-inputs. The receiving includes receiving user-input within the range of acceptable user-inputs. The generating includes generating a feasible coverage path based on the user-input. The displaying includes displaying at least some detail of the feasible coverage path.

19 Claims, 6 Drawing Sheets

(56) References Cited

U.S. PATENT DOCUMENTS

2016/0016312 A1\* 1/2016 Lawrence, III ........ B25J 9/1671
       901/41
2017/0192431 A1\* 7/2017 Foster .................. G05D 1/0217

OTHER PUBLICATIONS

Written Opinion dated Jan. 14, 2019 for corresponding International Application No. PCT/AU2018/051296, filed Dec. 4, 2018.
Driscoll, Theresa Marie, "Complete Coverage Path Planning in an Agricultural Environment", Graduate Theses and Dissertations, Iowa State University, Ames, Iowa, 2011, retrieved from internet on Oct. 16, 2018, URL https://ib.dr.iastate.edu/etd/12095.

\* cited by examiner

COVERAGE PATH PLANNING

CROSS-REFERENCE TO RELATED APPLICATIONS

This Application is a Section 371 National Stage Application of International Application No. PCT/AU2018/051296, filed Dec. 4, 2018, which is incorporated by reference in its entirety and published as WO 2019/136510 A1 on Jul. 18, 2019, not in English.

FIELD OF THE INVENTION

The invention relates to coverage path planning.

BACKGROUND TO THE INVENTION

A coverage path is a path traversable, e.g. by a vehicle, to cover an area. By way of example, when mowing a rectangular area of lawn that is 3 m wide by 10 m wide utilising a lawn mower having a 600 mm wide cut, the coverage path might have five parallel 10 m long passes.

This coverage path is a simple example of a boustrophedon path. A boustrophedon path is a serpentine path of straight parallel runs each adjacent two of which are mutually connected at one end of the runs by a respective short path portion turning through 180°.

Coverage path planning is applicable in a wide range of applications including those related to land vehicles (such as lawn mowers) and other vehicles such as water vessels and aircraft. Indeed, some variants of the technology disclosed herein may be advantageously applied to making efficient use of human searchers.

Path planning merely to minimise the length of the path to be traversed is trivial in the context of a simple convex area such as the simple area of lawn mentioned above. However, as the shape of the area in need of coverage becomes more complex, the complexity of the coverage path planning task explodes such that minimising the length of the coverage path of some realistic areas may require impractical computation time (e.g. years of computation).

Furthermore, in various applications the shortest path is not necessarily the optimal path. In the context of a weed-spraying agricultural vehicle spraying a large area over a number of days, it may be desirable to treat certain portions of the area before others and/or to avoid repeated traversals of particular areas, e.g. to minimise the risk of the vehicle bogging and/or to minimise soil compaction.

In principle, it is possible to arrive at an optimal coverage path by, for example, assigning cost functions to traversing particular areas and to traversing particular areas at particular times. In practice, this requires input from highly skilled path planning experts. Moreover, the problems of computation time remain and are compounded. Indeed, the problems may be computationally intractable.

It would be highly desirable to enable non-expert users to plan satisfactory coverage paths within practical time limits.

With the foregoing in mind, the present invention aims to provide improvements in and for coverage path planning, or at least to provide an alternative for those concerned with coverage path planning.

SUMMARY

One aspect of the invention provides a method of planning a coverage path to cover an area divided into cells; the method comprising a computing arrangement, configured to receive a range of acceptable user-inputs, iteratively
- generating a feasible coverage path based on the cells;
- displaying at least some detail of the feasible coverage path; and
- receiving user-input within the range of acceptable user-inputs;

wherein, after a first iteration, the generating is based on the user input; and
the range of acceptable user-inputs includes
- input identifying, and specifying the merger of, any adjacent two of the cells;
- input identifying, and specifying the division of, one of the cells; and
- input identifying, and specifying a revised ordering of, two of the cells.

Also disclosed is a method of planning a coverage path to cover an area;
the method including a computing arrangement, configured to receive a range acceptable user-inputs, iteratively
- receiving user-input within the range of acceptable user-inputs;
- generating a feasible coverage path based on the user-input; and
- displaying at least some detail of the feasible coverage path.

The area may be divided into cells. The generating may be based on the cells. Preferably the feasible coverable path includes respective path portions, each of the respective path portions being continuous and covering a respective one of the cells. Most preferably at least most of the respective path portions are respective boustrophedon path portions.

Optionally each of the respective path portions has two end points and the range of acceptable user-inputs includes input identifying, and specifying movement of, one or more of the end points. Preferably the displaying includes displaying potential end point locations, and the range of acceptable user-inputs includes a selection from the potential end point locations.

The feasible coverage path may include travel path portions connecting the respective path portions. Preferably the travel path portions are along boundaries of the cells. The displaying may include displaying the travel path portions.

The method may include the computing arrangement dividing the area into the cells. Preferably the dividing is dividing so as to ensure that each of the cells has a respective boundary shaped to be crossed not more than twice by any line parallel to a direction.

The range of acceptable user-inputs may include one or more of:
- input identifying, and specifying the merger of, two or more of the cells;
- input identifying, and specifying the division of, one or more of the cells; and
- input identifying, and specifying a revised ordering of, two or more of the cells.

Preferably the at least some detail includes an indication of one or more distances to be traversed, e.g. of a length of the feasible coverage path and/or lengths of distances to and from the start and finish points of the feasible coverage path (e.g. relative to a home location of the traversing entity) and/or the combination of these lengths.

The range of acceptable user-inputs may include one or both of:
- user-pointing; and
- input via a touch screen of the computing arrangement.

The method may include assigning each of two or more vehicles to respective portions of the feasible coverage path.

Another aspect of the invention provides a method of covering an area including
planning a coverage path; and then
causing one or more vehicles to follow the feasible coverage path.

The area may be an area of agricultural land.

Another aspect of the invention provides a computer readable medium configured to configure a computing arrangement to co-operate with a human to plan a coverage path.

Another aspect of the invention provides a computing arrangement configured to co-operate with a human to plan a coverage path Another aspect of the invention provides a computer program configured to configure a computing arrangement to co-operate with a human to plan a coverage path.

DETAILED DESCRIPTION

Figure 1:
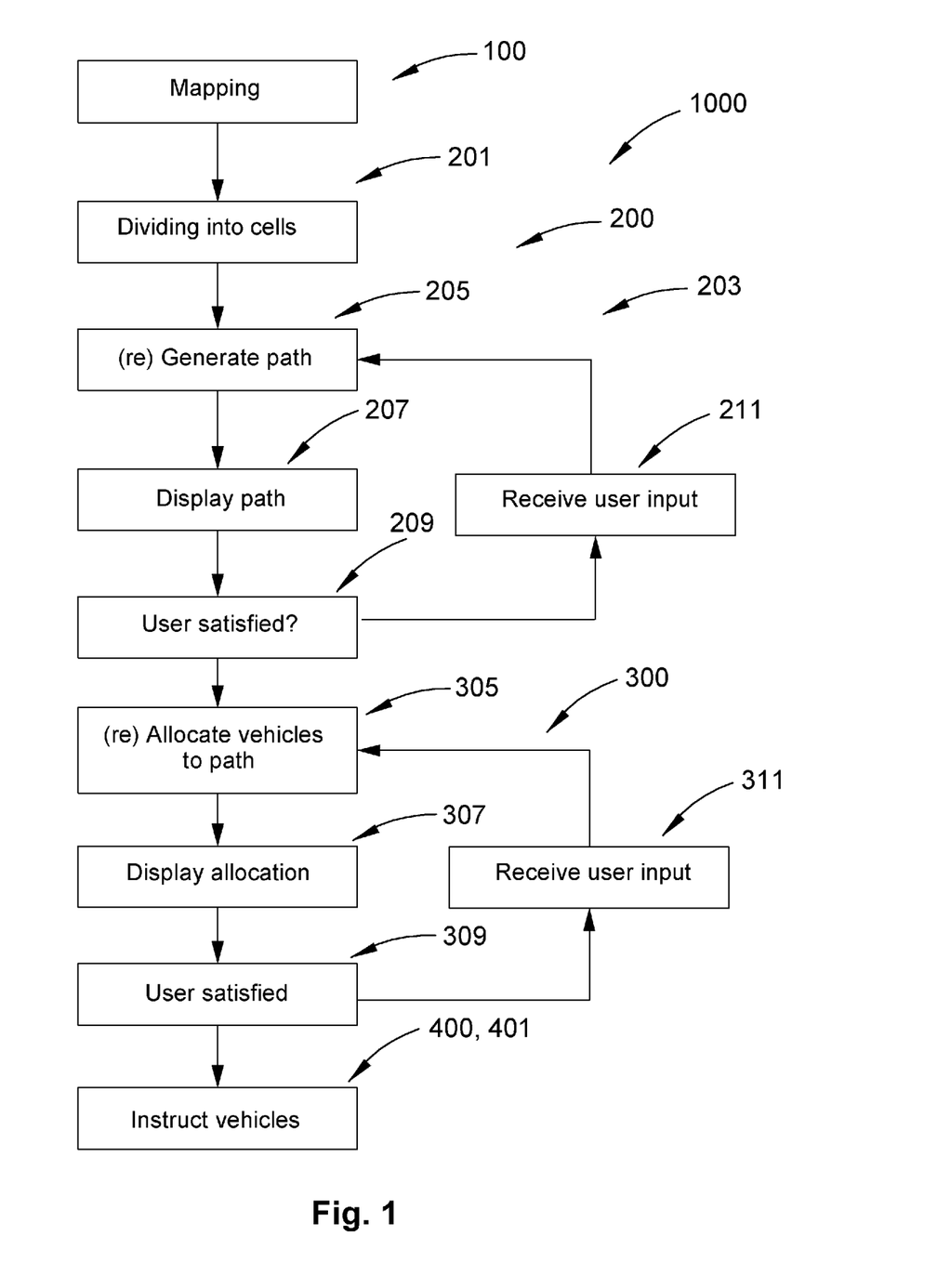
FIG. 1 is a flow chart of an area-covering process.

FIG. 1 illustrates an area-covering process 1000 for covering an area of agricultural land utilising an autonomous vehicle, e.g. a spraying vehicle. The process 1000 includes a mapping step 100, a path planning step 200, a path allocating step 300 and an area covering step 400.

At step 100 the area of interest is mapped, e.g. mapped in terms of GPS coordinates or any other convenient reference system. This may entail (manually and/or electronically) selecting boundaries from satellite data (e.g. satellite images) or maneuvering of a GPS-antenna-carrying vehicle about the boundaries of the area to log the requisite data. Advantageously, the outer boundary of the area is then mapped as a polygon (i.e. a closed chain of line segments). Any internal boundaries (e.g. trees, lakes and other obstacles within the agricultural area) are likewise mapped as polygons.

At step 201 the area is subsequently divided into cells. The division may form part of the path planning process 200. Alternatively, the cells may be an input supplied to the process 200.

As will be described, within the process 200 each cell is notionally covered by a respective portion of a broader coverage path. Accordingly, step 201 preferably entails dividing in accordance with rules selected to simplify the path planning for each respective cell.

Preferably each cell is shaped so that, for at least one direction, no line parallel to that direction crosses the cell boundary more than twice. This geometric constraint enables each cell to be populated by a respective boustrophedon path portion with very little computational effort.

Some areas have an A-B direction corresponding to a preferred direction along which moveable entities (e.g. vehicles or people) should move through the area. In the context of row crops, the A-B direction is parallel to the rows.

In the context of areas having an A-B direction, the above geometric constraint on the cells is preferably based on the A-B direction of the area so that no cell has a boundary crossed more than twice by any line parallel to the A-B direction of the area. In other contexts, each cell may have its own A-B direction.

Various algorithms, for decomposing an area into cells based on geometric features, are available to the skilled person. One variant of the step 201 entails a sweep line parallel to the A-B direction being swept across the map of the area and a cell boundary parallel to the A-B direction being defined each time the sweep line coincides with an end of one of the lines of the map. The step 201 preferably further entails an auto-merging algorithm that works through the cells so created and merges adjacent cells if possible without breaching the above geometric constraint.

The computing arrangement then moves into an iterative loop 203 within the path planning step 200. At step 205 a feasible coverage path for the total area is generated.

According to a preferred implementation, step 205 proceeds as a sequence of two sub-steps. Firstly, each individual cell is populated with a respective path portion covering that cell.

The populated cells are then ordered. This may be a relatively simple graph traversal that may be solved with Travelling Salesman approximation algorithms. A preferred approach entails a depth first search on the parent/child cell hierarchy with a greedy selection of cell permutation to approximate the optimal solution for total distance. Each cell-covering path portion will have its own end points along the cell boundary. One of those points is the start or entry point for that cell and path portion. The other of those end points is the exit or finish point for that cell and path portion.

As part of the cell ordering sub-step, travel path portions are defined to mutually connect the finish point of each cell (other than the last cell) to the start point of the subsequent cell. The travel path portions preferably run along the cell boundaries. Preferably the cell-covering path portions and travel path portions together form a single continuous feasible coverage path for covering the area.

Figure 2:
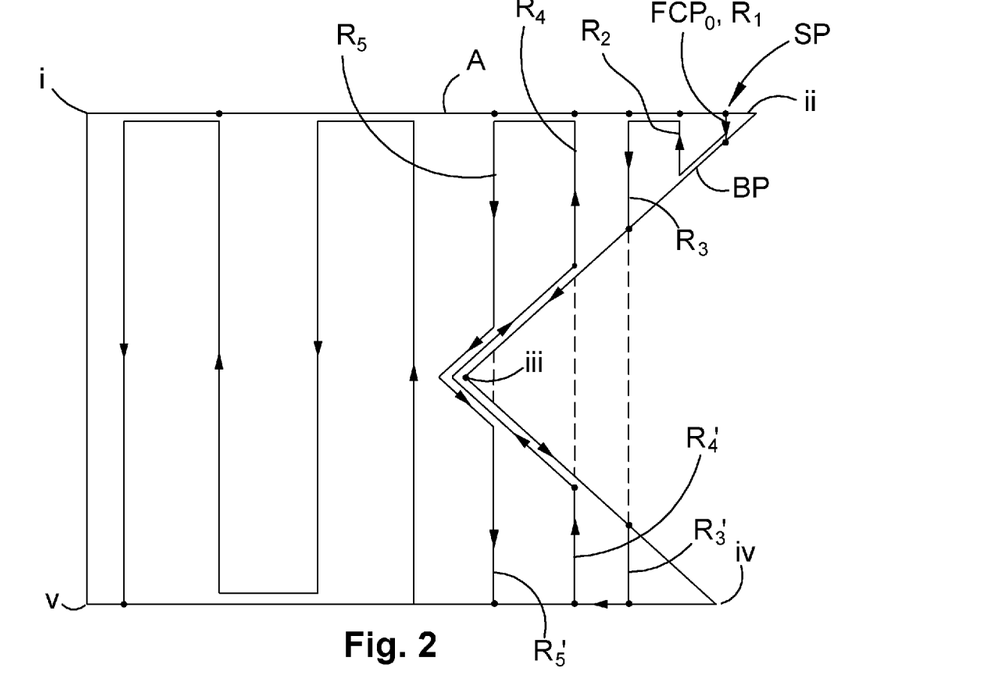
FIGS. 2 to 5 illustrate options for covering an area.

FIG. 2 illustrates an area A enclosed by a five-sided boundary having vertices i to v populated by a less than ideal feasible coverage path $FCP_0$. $FCP_0$ is generated with a simple algorithm that attempts to fit a boustrophedon path starting at start point SP. The path includes a first downward run $R_1$ before following the boundary along boundary portion BP, then returning along upward run $R_2$.

On the subsequent downward run $R_3$, the algorithm recognises that there is a need to traverse portion $R_3'$ in alignment with a portion $R_3$ but separated therefrom by re-entrant boundary portion ii-iii-iv. The simple algorithm causes the path to follow the boundary of the re-entrant portion to get to the portion $R_3'$. The path portions $R_4$, $R_5$ are likewise connected to the path portion $R_4'$, $R_5'$ via path portions running along the re-entrant boundary portion.

Whilst the simple algorithm is able to generate a feasible path with very little computational effort, that path is less than ideal. The path is longer than it needs to be and the area in the vicinity of vertex iii is thrice traversed, potentially leading to adverse soil compaction, etc.

An alternate simple algorithm may entail first filling the upper triangular portion and then filling the lower right triangular portion before returning to fill the larger area to the left of vertex iii.

For simple areas such as the area A, these simple filling algorithms produce workable results that are less than satisfactory. Applying such simple algorithms to more complex shapes typically leads to an even less satisfactory path and/or computational problems.

Figure 3:
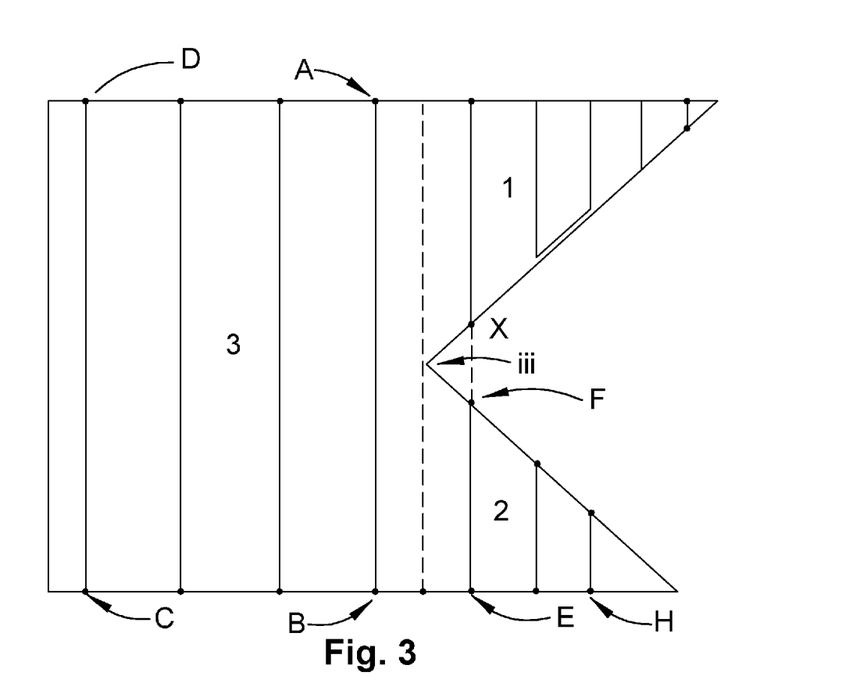

FIG. 3 illustrates the division of the area A into three cells 1, 2, 3. The cells 1, 2, 3 are generated by moving a sweep line from right to left until it reaches the vertex iii at which a cell boundary parallel to the sweep line and extending in both directions from the vertex iii is generated.

Figure 4:
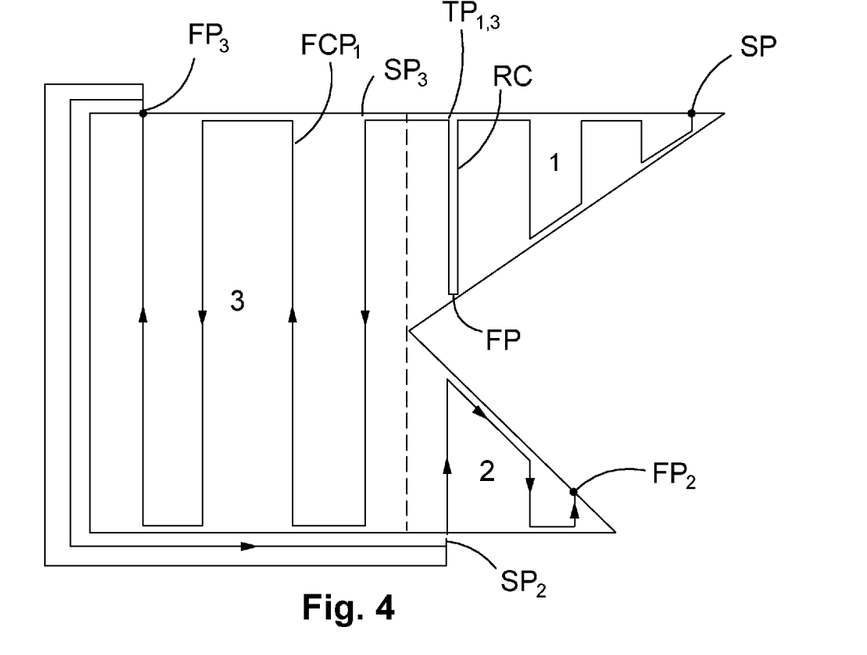

FIG. 4 illustrates how applying the simple algorithm of FIG. 2 to each of the cells 1, 2, 3 separately leads to a more efficient result.

The cell 1 is first populated with a simple boustrophedon path connecting the starting point SP to the finish point FP including a downward final run $R_F$.

Likewise:
cell 2 is populated with a simple boustrophedon path connecting start point SP2 to finish point FP3; and
cell 3 is populated by a simple boustrophedon path connecting start point SP3 to finish point FP3.

The next sub-step of step 205 entails ordering the cells. The algorithm dictates that the cells be traversed in the order of 1-3-2. For this purpose, a travel path $TP_{1,3}$ is added from the finish point $FP_1$ to the start point $SP_3$.

The travel path $TP_{1,3}$ includes an upward portion retracing the downward run $R_F$. Travel path $TP_{3,2}$ connects finish point $FP_3$ to start point $SP_2$. Through these computationally simple steps, the path $FCP_1$ is superior to the path $FCP_0$. Moreover, the logic can be extended to more complex areas and yield workable results within satisfactory computational timeframes.

At step 207 the path $FCP_1$ is displayed to a user. A touch screen device, such as an iPad™, is a preferred form of user interface including a display, although other user interfaces and displays are possible. By way of example, the display could take the form of a wearable device such as Glass™ glasses.

At step 207 substantially all of the feasible coverage path might be displayed, e.g. in a manner akin to FIG. 4. Alternatively, only selected details might be displayed. For larger shapes, the individual cell-covering path portions may clutter the display in which case it may be convenient to display only the travelling path portions. Indeed, it may be convenient to display only the travelling path portions over a defined length. Alternatively, the display might take the form of a heat map colour-coded to convey the time at which various areas are covered or colour-coded to identify areas that are more heavily traversed than others. The computing arrangement may be configured to enable a user to switch between display modes to display selected details. Other details, such as the start point and finish point of each vehicle, may also be displayed.

Preferably, the display includes details overlaid over an image of the area. In the context of covering an area of land and/or water, preferably the display corresponds to an overhead view of the area. For example, an outline corresponding to an overhead view may be overlaid on a satellite image of the area.

From the display the user can efficiently gain an understanding of the feasible coverage path $FCP_1$ and apply human judgement and intuition thereto to identify room for improvement.

At step 209 a user is given an opportunity to convey one of satisfaction or dissatisfaction with the path $FCP_1$. The user might convey dissatisfaction by providing user-input. For this purpose, the control arrangement is preferably configured to receive a range of inputs. Most preferably features of the plan (i.e. features of the area, features of the cells, the cells per se and features of the path FCP) are selectable by user-pointing. Most preferably the computing arrangement is configured to enable a user to provide a range of inputs enabling the user to merge cells, split cells, reorder the cells and reverse the direction of traversal along each of one or more selected cell-covering path portions.

User-pointing is another preferred form of user-input. A user touching a touch screen is one form of user-pointing. Other forms may entail a pointing device such as a mouse or a stylet. Alternatively, the user might simply point to a region of space that they understand, from for example a wearable display, to correspond to a feature of the plan.

In the context of the touch screen, a user might touch the finish point FP and then touch the end point $FP_2$ to provide user-input identifying, and specifying a sequential connection between, the end point FP, $FP_2$.

Figure 5:
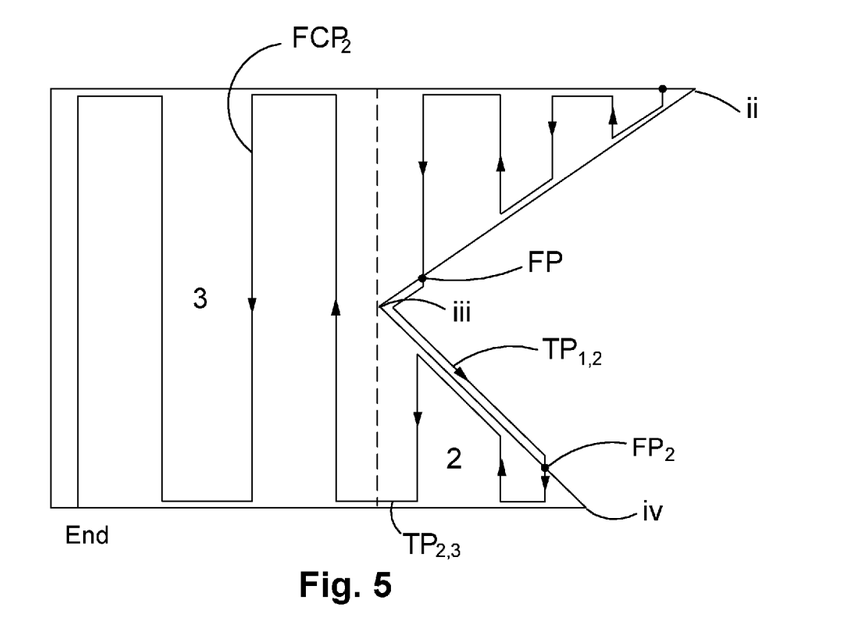

After receiving this user-input, the computing arrangement may automatically move on to step 205 or it may await instruction to move on from the user. At the second iteration of the step 205, a further iteration of the feasible coverage path $FCP_2$ is generated based on the user-input that point $FP_2$ should follow point FP. In response to this user-input, the computing arrangement defines travel path $TP_{1,2}$ along the boundary ii-iii-iv and correspondingly adjusts the direction of traversal along the path portions covering the cells 2, 3. Path $FCP_2$ is superior to paths $FCP_0$, $FCP_1$ in that it is shorter and the only portion twice traversed is a short portion of the edge iii-iv.

Instead of specifically connecting the end points FP, $FP_2$, a user might simply specify that the cells be reordered. A preferred mode of reordering entails touching the cell and swiping, e.g. to the right or preferably up to advance the cell in the sequence and swiping the cell in the opposite direction to decrement its position in the sequence.

Likewise, improvements between $FCP_1$ (FIG. 4) and $FCP_2$ (FIG. 5) may also be effected by merging cells 2, 3. A preferred mode of merging entails simultaneously touching and holding the two cells to be merged. For the avoidance of doubt, holding is touching for a period longer than simple touching that is regarded as pointing.

Figure 6:
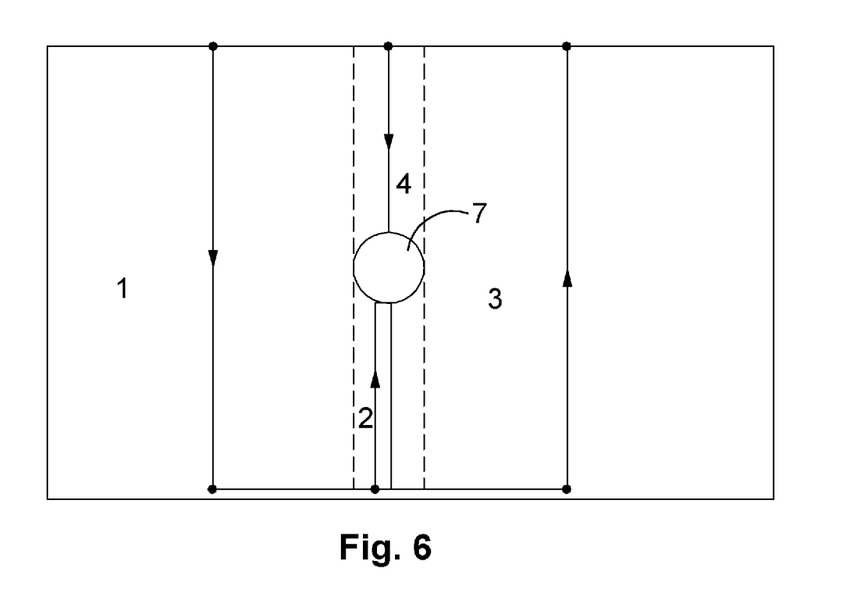
FIGS. 6 and 7 illustrate options for covering another area.
Figure 7:
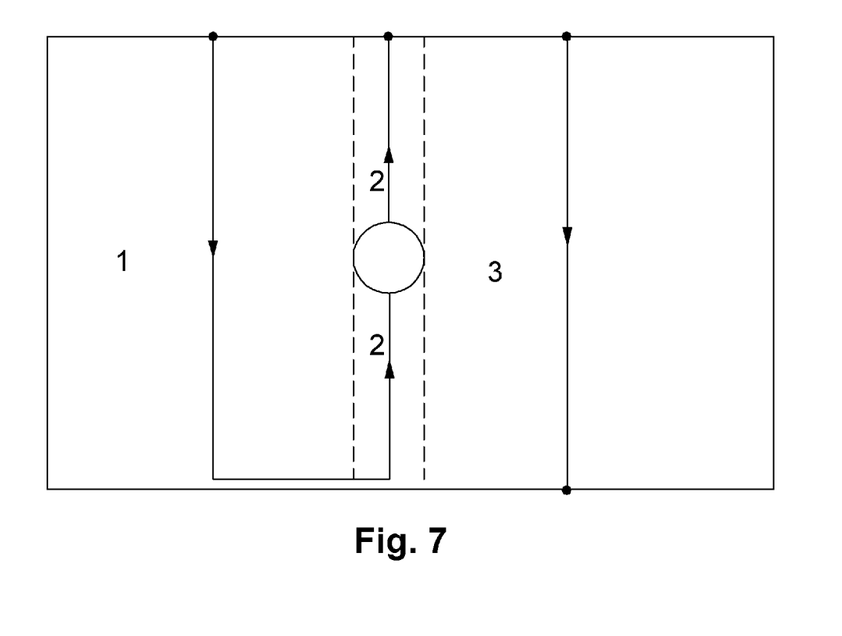

FIGS. 6 and 7 illustrate geometry wherein merging cells leads to advantages. FIG. 6 illustrates a simple rectangular area interrupted by a small obstacle in the form of a tree T. Following steps 201, 205 leads to four distinct cells 1, 2, 3, 4 recognisably inefficient to a human user. By merging the cells 2, 4, the boustrophedon-path-defining algorithm finds a path following the perimeter of the tree (in a manner akin to the portions following the boundary i-iii-iv in FIG. 2) leading to a shorter path than in FIG. 6.

It might be advantageous to split a large cell where:
a) splitting a large cell enables travel paths to and from adjacent smaller cells to be minimised; and/or
b) it is desirable to cover one portion of the large cell before covering another portion.

Preferably the range of acceptable user-inputs includes a user holding a cell in response to which a dividing boundary is generated. Preferably the dividing boundary is a straight line and most preferably is coincident with the point at which the cell is held. The dividing line may be parallel to the A-B direction of the cell and/or the A-B direction of the area (if there is any such A-B direction). Optionally the new dividing line may remain in a selectable mode (e.g. remain for a predetermined period, say two seconds) during which it may be moved (e.g. rotated and/or translated). The line may then be 'fixed' in its position by tapping elsewhere on the screen or otherwise causing or allowing the line to become fixed.

Figure 8:
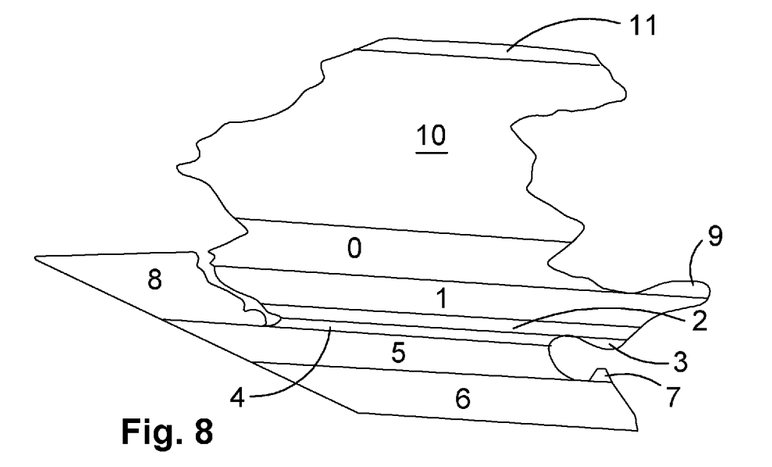
FIGS. 8 to 10 illustrate options for covering another area.
Figure 9:
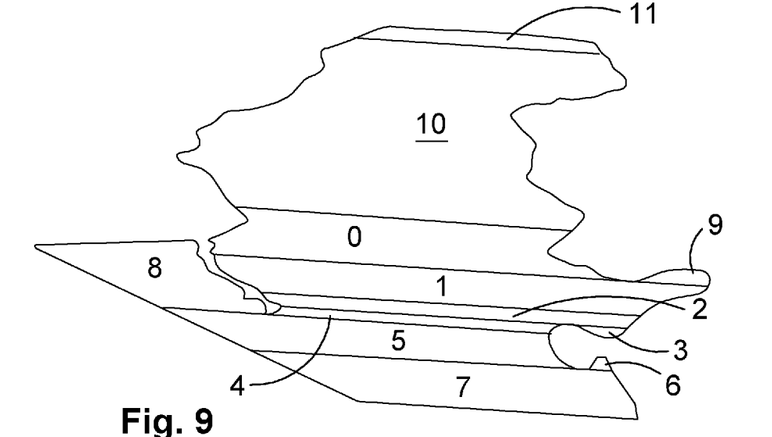
Figure 10:
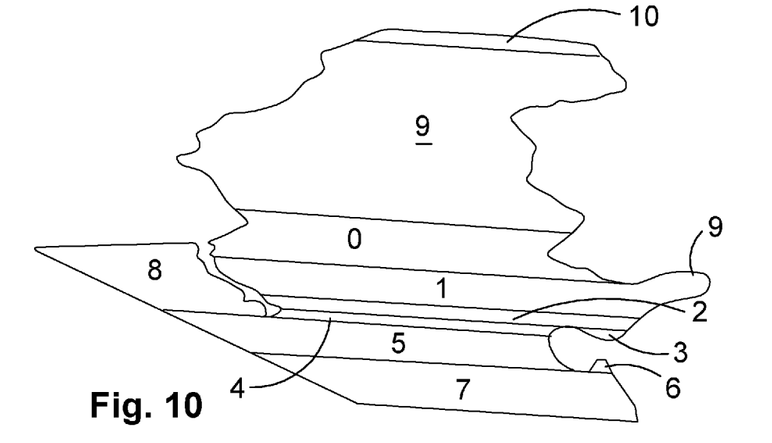

FIGS. 8 to 10 illustrate the efficiencies to be gained in the context of covering a 568-hectare paddock of row crops utilising a vehicle having an effective width of 8 m. FIG. 8 illustrates the area divided into 12 cells (cells 0 to 11) as generated and ordered at the first iteration of step 205. The vehicle starts in cell 0 and works through the cells in the order in which the cells are numbered.

When faced with a display (at step 207) akin to FIG. 8, a human user may intuit that there is room for improvement by reversing the order of cells 6 and 7. In a preferred implementation, a user touches cell 6 to first select it and then swipe upwards to move cell 6 to a numerically higher position in the ordering, that is to swap cells 6 and 7 as illustrated in FIG. 9. Thus, via a simple touch and swipe operation, cells 6 and 7 are identified and their reordering is specified.

From this iteration of step 211, the computing arrangement moves through step 205 onto step 207 whereat the human user's intuition is borne out by a display confirming that the length of the coverage path has been reduced to 715 km.

Subsequently, the human user may further intuit efficiencies to be realised by merging cells 1 and 9. Preferably this is achieved by simultaneously pointing to cell 1 and 9 at another iteration of step 211 before the computing arrangement moves on step 207, at which the user's intuition is again borne out by confirmation of a reduced path length, in this case the path length is reduced to 714 km.

Preferred implementations of the method enable a user to provide input specifying 'undo' at least the most recent user-input. By way of example, if merging cells 1 and 9 between FIGS. 9 and 10 proved to be counter-productive, a user might simply press an undo icon on the touch screen as opposed to providing inputs to redefine a boundary between the two portions of the larger cell 1 of FIG. 10.

Figure 11:
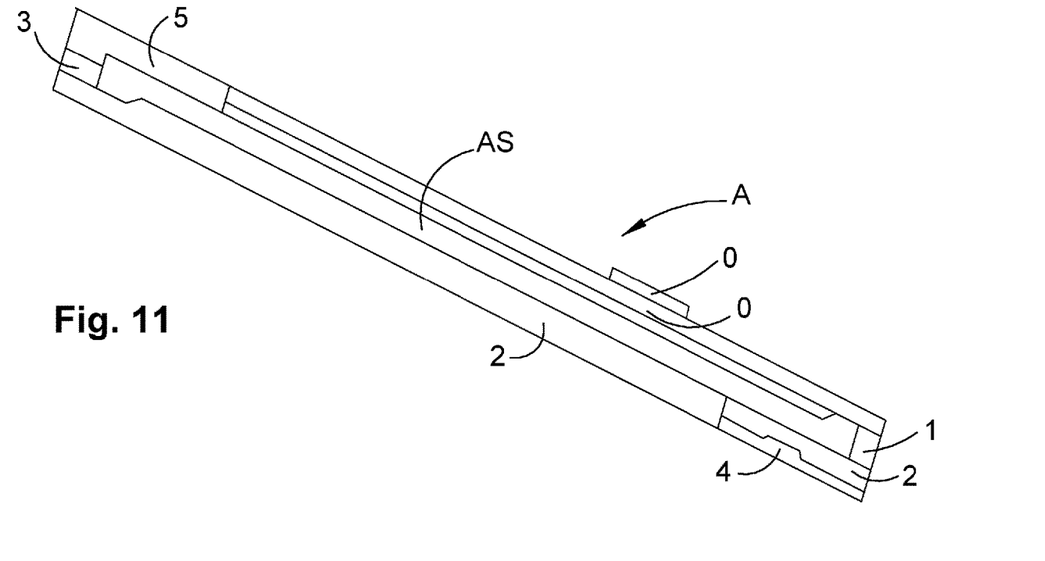
FIGS. 11 and 12 illustrate options for covering another area.
Figure 12:
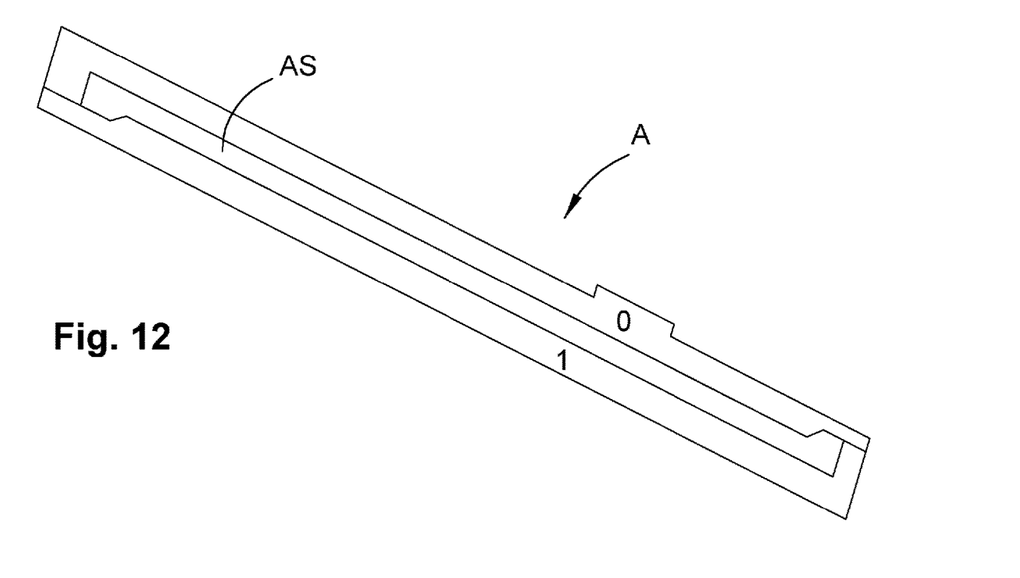

FIGS. 11 and 12 illustrate the cells of coverage path plan for covering 35 Ha area A (of grass surrounding an airstrip AS) utilising a vehicle having an effective width of 6 m.

FIG. 11 illustrates one set of potential cell boundaries corresponding to a travel path of 68 km whereas FIG. 12 illustrates the result of merging those cells so that only two cells (cell 0 and cell 1) remain, leading to a path length of 58 km.

These reductions in path length can be important, e.g. in the context of an agricultural vehicle moving at only about 6 kph, significant time may be saved. Preferred implementations of the method enable two or more vehicles to be allocated to the travel path.

The allocation process 300 is preferably an iterative process akin to the loop 203. At the first iteration of step 305, the available vehicles are automatically assigned, by the computing arrangement, to respective portions of the feasible travel path. In a simple implementation, the coverage path may simply be divided into segments of equal length. Potentially that division may be automatically 'rounded off' to the nearest cell boundary or to the nearest end point of a respective-cell-covering portion of the feasible coverage path. In more sophisticated implementations, the distance that each vehicle must travel to and from the start and finish of its respective portion of the feasible coverage path may be taken into account.

The allocation of the vehicles to the path is displayed at step 307. A preferred mode of display entails a graphical representation of the feasible coverage path in which each segment has a respective colour-code to correspond to one of the vehicles. Of course, other visual identifiers (such as symbols along the path and/or patterned areas of the representation) may be used instead of or in addition to colour-coding.

At step 309 a user assesses that display. If they are not satisfied with the allocation, user-input is provided at step 311. Preferably the range of acceptable user-inputs includes input:

to vary the number of divisions;
to assign a respective vehicle to more than one of the segments; and
to vary the lengths of the segments.

Preferably the number of divisions is variable using interface elements such as a drop-down box, or up/down arrows to increase/decrease the number of divisions.

Preferably the length of a segment is variable by a point and swipe (e.g. touch and swipe) operation. By way of example, on a touch screen, a user may touch a segment and swipe upwards to increase its length or downwards to decrease its length. Preferably a start point of the selected segment remains fixed whilst its finish point is moved.

Preferably vehicles are allocatable to respective segments by double-pointing to, e.g. double-tapping on, the respective segment. Most preferably this double-pointing operation leads to a drop-down interface element appearing to allow a different vehicle to be chosen.

Once a user is satisfied at step 309 with the allocation of the paths, the method may move on to the area covering step 400, e.g. at step 401 a user may press an instruct-vehicles icon to cause details of the coverage path and the vehicle allocations to be passed on to the vehicles.

In the preceding examples, the feasible coverage paths are continuous coverage paths. Alternatively, a coverage path for covering an area may be made up of multiple discontinuous coverage path portions, e.g. a respective continuous coverage path portion for each of a plurality of vehicles. By way of example, loops 203, 300 may be combined to enable vehicle allocation and transport to and from the vehicle start and finish points to be taken into account when planning the coverage path.

A preferred implementation entails a mechanism by which a user can switch between a planning mode corresponding to the loop 203 and an allocate mode corresponding to the loop 300. In the context of a touch screen device, the mechanism may take the form of plan and allocate buttons displayed on the touch screen, to enable a user to switch back and forth between the plan and allocate modes, and to perform the associated operations, by touching the plan/allocate buttons. The process can continue until the user arrives at a final feasible coverage path and allocation, details of which can be saved and transmitted to the vehicles for execution.

In the preceding examples, the area to be covered is divided into cells. Other variants of the path planning process disclosed herein may do without this division step. By way of example, a first iteration of the step 207 may present a user with a display akin to FIG. 2, and in response to that display a user might assign a cost function to the area in the vicinity of vertex iii so that a further iteration of the path plan is less likely to include multiple traversals in the vicinity of that vertex.

In this example, the allocating process 300 allocates vehicles to a path planned in accordance with planning step 200. Alternatively, the allocating process 300 may advantageously be applied to allocate vehicles to paths otherwise generated.

Advantageously, a computing arrangement such as an iPad™ may be configured to perform the described method by installing on the computing arrangement a computer program. The computer program might take the form of a downloadable application. Alternatively, it might be conveyed on a computer-readable medium such as a USB key. The medium may carry instructions executable by the computing arrangement to cause the computing arrangement to operate in accordance with the described method.

Whilst various examples have been described, the invention is not limited to these examples. Rather, the invention is defined by the claims.

The invention claimed is:

1. A method comprising:
    planning a coverage path to cover an area divided into cells, the planning comprising using a computing arrangement, configured to receive a range of acceptable user-inputs, and iteratively:
    generating a feasible coverage path based on the cells;
    displaying at least some detail of the feasible coverage path; and
    receiving user input within the range of acceptable user-inputs;
    wherein, after a first iteration, the generating is based on the user input; and the range of acceptable user-inputs includes:
    input identifying, and specifying a merger of, any adjacent two of the cells;
    input identifying, and specifying a division of, one of the cells; and
    input identifying, and specifying a revised ordering of, two of the cells.

2. The method of claim 1 wherein the feasible coverable path includes respective path portions; and
    each of the respective path portions is continuous and covers a respective one of the cells.

3. The method of claim 2 wherein at least most of the respective path portions are respective boustrophedon path portions.

4. The method of claim 2 wherein each of the respective path portions has two end points; and
    the range of acceptable user-inputs includes input identifying, and specifying movement of, one or more of the end points.

5. The method of claim 4 wherein the displaying includes displaying potential end point locations; and
    the range of acceptable user-inputs includes a selection from the potential end point locations.

6. The method of claim 2 wherein the feasible coverage path includes travel path portions connecting the respective path portions.

7. The method of claim 6 wherein the travel path portions are along boundaries of the cells.

8. The method of claim 6 wherein the displaying includes displaying the travel path portions.

9. The method of claim 1 wherein the at least some detail includes an indication of one or more distances to be traversed.

10. The method of claim 1 wherein the range of acceptable user-inputs includes user-pointing.

11. The method of claim 1 wherein the receiving is receiving via a touch screen of the computing arrangement.

12. The method of claim 1 including assigning each of two or more vehicles to respective portions of the feasible coverage path.

13. The method of claim 1, further comprising dividing the area into the cells.

14. The method of claim 13 wherein the dividing the area is dividing so as to ensure that each of the cells has a respective boundary shaped to be crossed not more than twice by any line parallel to a direction.

15. The method of claim 13 wherein the dividing is performed by the computing arrangement.

16. The method of claim 1, further including:
    after the planning,
    causing one or more vehicles to follow, the feasible coverage path, to cover the area.

17. The method of claim 1 wherein the area is an area of agricultural land.

18. A non-transitory computer readable medium comprising instructions stored thereon, which when executed by a computing arrangement configure the computing arrangement to plan a coverage path to cover an area divided into cells, by:
    receiving a range of acceptable user-inputs, and
    iteratively:
        generating a feasible coverage path based on the cells;
        displaying at least some detail of the feasible coverage path; and
        receiving user-input within the range of acceptable user-inputs;
    wherein, after a first iteration, the generating is based on the user input; and the range of
    acceptable user-inputs includes:
    input identifying, and specifying a merger of, any adjacent two of the cells;
    input identifying, and specifying a division of, one of the cells; and
    input identifying, and specifying a revised ordering of, two of the cells.

19. A computing arrangement configured to plan a coverage path to cover an area divided into cells, by:
    receiving a range of acceptable user-inputs, and
    iteratively:
        generating a feasible coverage path based on the cells;
        displaying at least some detail of the feasible coverage path; and
        receiving user-input within the range of acceptable user-inputs;
    wherein, after a first iteration, the generating is based on the user input; and the range of acceptable user-inputs includes:
    input identifying, and specifying a merger of, any adjacent two of the cells;
    input identifying, and specifying a division of, one of the cells; and
    input identifying, and specifying a revised ordering of, two of the cells.

* * * * *